UNITED STATES PATENT OFFICE.

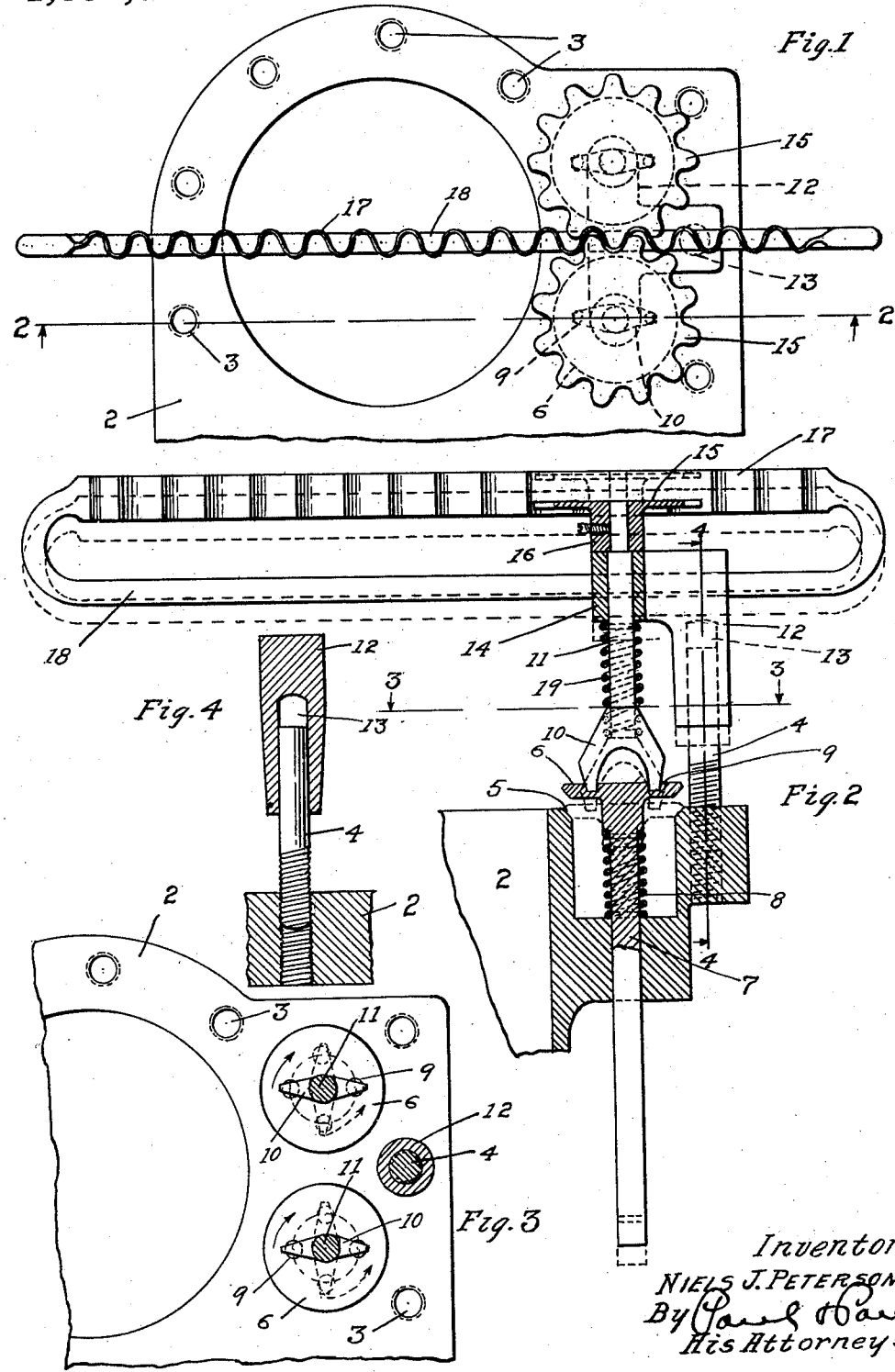

NIELS JULIUS PETERSON, OF MINNEAPOLIS, MINNESOTA.

VALVE-GRINDER.

1,393,567.  Specification of Letters Patent.  Patented Oct. 11, 1921.

Application filed January 30, 1920. Serial No. 355,255.

*To all whom it may concern:*

Be it known that I, NIELS J. PETERSON, a citizen of the United States, resident of Minneapolis, county of Hennepin, State of Minnesota, have invented certain new and useful Improvements in Valve-Grinders, of which the following is a specification.

The object of my invention is to provide a device by means of which the valves of an internal combustion engine can be easily and quickly ground and fitted to their seats.

A further object is to provide a device of the class described, particularly adapted for grinding valves of a Ford engine.

Other objects of the invention will appear from the following detailed description.

In the accompanying drawings forming part of this specification,

Figure 1 is a plan view of a portion of a Ford engine cylinder, and valves, with my invention applied thereto, Fig. 2 is a sectional view on the line 2—2 of Fig. 1, Fig. 3 is a sectional view on the line 3—3 of Fig. 2, Fig. 4 is a sectional view on the line 4—4 of Fig. 2.

In the drawing, 2 represents the wall of the cylinder and particularly a cylinder of the Ford engine type. This wall is provided with a series of holes 3 tapped therein by means of which the head of the cylinder (not shown) may be bolted securely in place. 4 represents a stud that is threaded to fit into one of the holes in the cylinder wall that is located in engines of this type at a point midway between the valve seats 5 of the valve 6 which have stems 7 extending down through the wall of the engine and normally held in their open position preparatory to grinding by suitable springs 8. These valves are of the usual type, having beveled edges to fit the correspondingly shaped surfaces of the seats and sockets 9 are formed in the upper surfaces of the valves to receive forks 10 mounted on studs 11. A bracket 12 has a socket 13 therein to receive the upper end of the pin 4 and on which pin the bracket is free to slide vertically. The upper portions of the studs 11 have bearings 14 in the brackets 12 and wheels 15 pressed preferably from sheet metal have hubs 16 secured to the upper ends of the studs 11 and bear on the upper surfaces of the bracket 12. The wheels 15 are of sufficient size to substantially bridge the space between the valves and allow the insertion of a serpentine bar 17 which is in the form of a rack, preferably pressed from sheet metal and joined at its ends to an operating rod 18 by means of which the bar may be reciprocated back and forth to revolve the wheels 15 and impart a corresponding movement to the valves. Springs 19 are mounted on the studs 11 and normally tend to hold the bracket in a raised position, as indicated in Fig. 2, with a space between the bottom of its socket and the upper end of the pin 4, thereby allowing downward movement of the value operating mechanism against the tension of the springs 19.

In operation, the user of the device will grasp the ends of the rod 18 and move the rack back and forth between the wheels 15 with a slight downward pressure sufficient to seat the valve and hold the forks 10 in operative engagement with the valves. The usual emery dust or other grinding material is inserted between the valves and their seats and the reciprocating movement of the rack bar will rotate the valves simultaneously and grind them down to a smooth finished surface in substantially the same manner as valves of this type are usually ground.

The advantage of this device lies in the fact that it is only necessary to remove the head plate of the engine, insert the pin 4 in the proper bolt hole therein, mount the bracket 12 on the supporting stud and then reciprocate the rack bar 17 to revolve the wheels and impart a corresponding movement to the valves and grind them down to their seats.

In dotted lines in Fig. 2 I have indicated how the device is pressed down to seat the valves in their working position before the grinding operation is begun.

The springs 8 shown herein are provided for normally tending to push the valves open during the grinding operation.

I claim as my invention:

1. A valve grinder including a support adapted to be secured to an engine block adjacent two opposed valves, studs rotatably borne in said support and adapted each to engage one of said valves, a gear affixed to each stud in adjacent spaced relation, and a rack bar presenting teeth on opposed sides adapted to be inserted between said spaced gears whereby, upon reciprocation of the bar, the gears are simultaneously rotated and the valves thereby ground to their respective seats.

2. A valve grinder adapted simultaneously to grind a plurality of valves including studs adapted each to engage one of said valves, supporting means whereby said studs may be rotatably mounted, a gear affixed to each stud in adjacent spaced paired relation, and a rack bar having teeth on opposed sides and adapted to be inserted between the spaced pairs of gears whereby, upon reciprocation of the bar, the gears may be simultaneously rotated and the valves ground to their respective seats.

3. A valve grinder adapted simultaneously to grind two valves including studs adapted each to engage one of said valves, supporting means whereby said studs may be rotatably mounted, a gear affixed to each stud in adjacent spaced relation, and a serpentine bar adapted to be inserted between said spaced gears whereby, upon reciprocation of the bar, the gears may be simultaneously rotated and the valves thereby ground to their respective seats.

4. A valve grinder adapted simultaneously to grind two valves, including studs adapted each to engage one of said valves, supporting means whereby said studs may be rotatably mounted, a gear affixed to each stud in adjacent spaced relation, and an elongated endless rack bar having substantially parallel arms, gear teeth on opposed sides of one of the arms, said toothed arm being adapted to be inserted between said spaced gears, the other arm being shaped to provide an operating handle whereby, upon reciprocation of the rack bar the gears may be simultaneously rotated and the valves thereby ground to their respective seats.

In witness whereof I have hereunto set my hand this 22d day of January, 1920.

NIELS JULIUS PETERSON.